No. 612,745. Patented Oct. 18, 1898.
J. C. MORRIS.
PLANT SETTING IMPLEMENT.
(Application filed Dec. 29, 1897.)

(No Model.)

WITNESSES:

INVENTOR
J. C. Morris.
BY
ATTORNEYS.

UNITED STATES PATENT OFFICE.

JOSEPH CALEB MORRIS, OF TAMPA, FLORIDA.

PLANT-SETTING IMPLEMENT.

SPECIFICATION forming part of Letters Patent No. 612,745, dated October 18, 1898.

Application filed December 29, 1897. Serial No. 664,287. (No model.)

*To all whom it may concern:*

Be it known that I, JOSEPH CALEB MORRIS, of Tampa, in the county of Hillsborough and State of Florida, have invented a new and Improved Plant-Setting Implement, of which the following is a full, clear, and exact description.

The object of the invention is to provide an implement adapted especially to create an opening in the ground for the reception of a plant and to supply water to said opening for the purpose of moistening the roots of the plant that is to be transplanted.

Another object of the invention is to provide an implement of the character above set forth which will be simple, durable, and economic, and capable of convenient and expeditious manipulation, and which will enable a person to transplant plants in sandy soil or other soil that necessitates irrigation without entailing a laborious stooping posture on the part of the operator.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
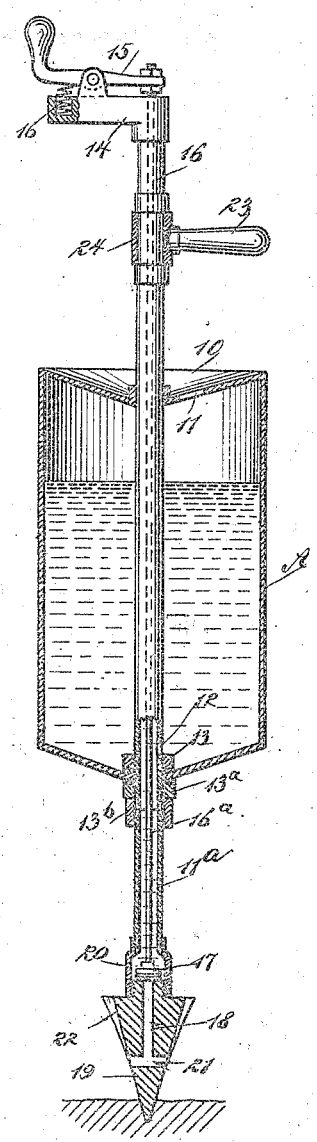
Figure 2:
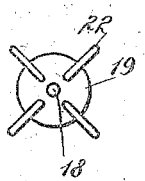
Figure 3:
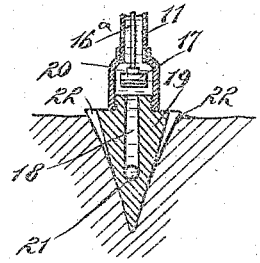

Figure 1 is a vertical section through the improved implement. Fig. 2 is a plan view of the drill of the implement; and Fig. 3 is a vertical section through the drill of the implement and a portion of the water-supply thereto, illustrating the drill in the ground.

A represents a can or a vessel of any suitable or approved construction adapted for puddling plants, the top 10 whereof is depressed and provided with an opening 11 in order that water may be poured upon the top of the said vessel and from thence readily find its way into the interior of said vessel. A tube 11ª is passed through the vessel A, extending beyond the top and below the bottom, and the said tube is provided within the vessel, preferably near its bottom, with an opening 12, through which water contained in the vessel may enter the tube. The vessel A is usually attached to the tube 11ª by means of two nuts 13 and 13ª, suitably packed, one nut being within the vessel and the other outside. Both nuts are preferably screwed upon the rod and engage with the bottom of the vessel, which latter is depressed at the center to permit the water to readily drain out.

It will be understood that when nuts 13 and 13ª are employed for holding the can on the tube the tube must necessarily be made in sections. As illustrated, the tube consists of a long body-section extending just below the can or vessel and a smaller lower section connected with the body-section by a coupling 13ᵇ.

At the top of the tube a horizontal arm 14 is secured, upon which arm a lever 15 is fulcrumed, the handle end of the lever being normally forced upward by a spring 16, as shown in Fig. 1. The opposite end of the lever 15 is attached to a rod 16ª, and the said rod extends downward into and through the tube 11ª, being provided at its lower end with a valve 17. In the normal position of the lever this valve is adapted to rest over and close the upper end of an opening 18, made in a drill 19, the drill being attached to the lower section of the tube 18ª by means of a coupling 20 of any approved or suitable construction. The drill 19 is usually triangular in vertical section, and the opening 18 communicates with a transverse opening 21. Blades or wings 22 are preferably made integral with the side surfaces of the said drill, as shown in the drawings, the blades or wings extending ordinarily from the top to a point at or near the transverse opening 21, and any desired number of wings or blades may be used. The handle 23 is provided with a sleeve 24, and the said sleeve is loosely mounted on the tube 11ª at a point between the arm 14 and the top of the vessel A.

In operation the handle 23 is grasped by one hand and the lever 15 by the other hand, the drill being entered into the ground, and by turning the lever 15, and consequently the tube 11ª, the said drill is forced into the ground, as shown in Fig. 3, to make an opening capable of receiving the roots of the plant. While the opening is being made, the handle end of the lever is pressed downward, which will raise the valve 17 and permit water to pass from the vessel A through the opening 12 into the tube 11ª, and from the said tube the water will pass through the openings 18 and 21 in the drill into the hole being formed by the drill, thus mixing the water and earth into mud and providing sufficient moisture to sustain the roots of the plant to be placed in said hole while the said plant is taking root. Thus three operations take place at once—the hole is made, water is supplied, and the earth is converted into mud.

It is customary in various of the Southern States to thoroughly moisten the earth in the hole prepared to receive the plant—in fact, to produce a mud-like mixture of water and earth in the bottom of the opening into which the plant is to be set—in order that the roots of said plant shall be supplied with sufficient moisture while the plant is starting to grow. The moistening of such openings adapted to receive plants has been heretofore effected by hand, and consequently the transplanting of plants has been attended by considerable hardship. While the implement above described is particularly adapted to suitably prepare the ground for the reception of the plant without necessitating the operator to be constantly in a stooping position, it may be advantageously used for other purposes—for example, for applying liquid fertilizer to plants or shrubs that have not been transplanted or that need such attention.

Having thus described my invention, I claim as new and desire to secure by Letters Patent—

1. The combination, with a vessel adapted to receive water, and a tubular shaft to which the vessel is attached, the shaft being provided with an opening within the said vessel, of a drill attached to the shaft and having an opening therein communicating with the opening in the shaft, a valve adapted to normally close the opening in the drill, a lever carried by the shaft, and a connection between the said lever and the said valve, for the purpose set forth.

2. The combination, with a receptacle adapted to receive liquid, a tubular shaft to which the said vessel is secured, the said tubular shaft being provided with an opening at a point within the vessel, and a drill attached to the said tubular shaft, provided with an opening communicating with the interior of the shaft and extending to the sides of the drill, of a lever mounted on the said shaft, a rod attached to the said lever, and a valve carried by the said rod, adapted to normally close the said opening in the drill, as and for the purpose specified.

3. The combination, with a receptacle adapted to contain a liquid, the said receptacle being provided with a depressed top having an opening therein, a tubular shaft to which the said receptacle is attached, the tubular shaft being provided with an opening at a point within the receptacle, an arm projected from the upper end of the said shaft, a spring-controlled lever mounted upon the said arm, and a handle loosely mounted upon the said shaft above the receptacle, of a drill attached to the lower end of the tubular shaft, the drill being provided with a T-opening extending vertically from the top and transversely to the sides, blades secured to the said drill, a valve adapted to normally close the vertical portion of the opening in the said drill, and a connection between the said valve and the said lever, for the purpose specified.

JOSEPH CALEB MORRIS.

Witnesses:
A. J. KNIGHT,
H. J. WATROUS.